(12) United States Patent
Nalbant (10) Patent No.: US 8,629,660 B2
(45) Date of Patent: Jan. 14, 2014

(54) CRITICAL CONDUCTION RESONANT TRANSITION BOOST POWER CIRCUIT

(75) Inventor: Mehmet K. Nalbant, Cupertino, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 508 days.

(21) Appl. No.: 12/696,826

(22) Filed: Jan. 29, 2010

(65) Prior Publication Data

US 2010/0225290 A1    Sep. 9, 2010

Related U.S. Application Data

(60) Provisional application No. 61/158,288, filed on Mar. 6, 2009.

(51) Int. Cl.
*G05F 1/56*   (2006.01)
(52) U.S. Cl.
USPC ........................ 323/222; 323/235; 323/905
(58) Field of Classification Search
USPC .................... 323/222, 235, 319, 905
See application file for complete search history.

(56) References Cited

U.S. PATENT DOCUMENTS

| | | | | |
|---|---|---|---|---|
| 3,654,547 A | * | 4/1972 | Julie | 323/233 |
| 5,180,964 A | * | 1/1993 | Ewing | 323/222 |
| 5,615,100 A | * | 3/1997 | Radecker et al. | 363/97 |
| 6,370,045 B1 | * | 4/2002 | Lurkens | 363/21.12 |
| 6,693,411 B2 | * | 2/2004 | Bub et al. | 323/282 |
| 7,800,353 B2 | * | 9/2010 | Komiya | 323/284 |
| 8,115,418 B2 | * | 2/2012 | Haubmann | 315/307 |

OTHER PUBLICATIONS

V.T. Valtchev et al. "Design considerations and loss analysis of zero-voltage switching boost converter" IEE Proc.—Electr. Power Appl., vol. 148, No. 1, Jan. 2001.

\* cited by examiner

*Primary Examiner* — Harry Behm
(74) *Attorney, Agent, or Firm* — Advent, LLP (57) ABSTRACT

A boost regulator is provided that has increased efficiency. The increased efficiency is provided by incorporating a sensing circuit that senses when the current in the boost regulator's inductor is near zero or when the voltage at its switching node is near zero or virtual ground. A switching signal is provided to the boost regulator's switching transistor when the near zero current or voltage is sensed. Switching at the near zero current or voltage moment (the "critical conduction moment") helps to eliminate or minimize the power loss associated with switching the transistor at a time other than during the critical conduction moment.

19 Claims, 5 Drawing Sheets

FIG. 6

CRITICAL CONDUCTION RESONANT TRANSITION BOOST POWER CIRCUIT

CROSS-REFERENCE TO RELATED APPLICATIONS

This application claims priority to U.S. Provisional Application No. 61/158,288, filed Mar. 6, 2009, entitled CRITICAL CONDUCTION RESONANT TRANSITION BOOST POWER CIRCUIT, which is incorporated herein by reference.

TECHNICAL FIELD

Embodiments of the invention relate to circuitry and methods of providing power management using a boost regulator circuit. More particularly, embodiments of the invention relate to power management for device driver circuits, including without limitation, a boost LED driver that may be used in Liquid Crystal Display (LCD) displays incorporated into televisions, video displays, monitors and other visual display devices, power management power supplies for monitors, electronic devices and in automotive applications.

BACKGROUND

Many monitors, televisions and graphic or video display units are now using plasma or LCD displays instead of cathode ray tubes. Plasma based displays emit visible light that can be viewed so an image can be seen by a user. Conversely, LCD displays do not emit light and therefore require backlighting or a light source positioned behind such LCD displays so that a user can view the image, picture or information being displayed. Cold cathode fluorescent lights (CCFLs) have been used to backlight LCD displays. For large LCD displays, 10 to perhaps 25 CCFLs may be organized in parallel behind the LCD display to provide ample and uniform backlighting for user viewing. One or more CCFLs operating together require special high voltage circuitry such as a high voltage transformer or voltage multiplier circuitry along with CCFL dedicated driver circuit. This specialized circuitry, in conjunction with the 10 to 25 CCFLs, is not as energy efficient as providing the same amount of lumens with a plurality of white or ultra bright Light Emitting Diodes (LEDs).

Another drawback of CCFL backlighting is that CCFLs contain mercury. Mercury is well known toxic metal that if not disposed of properly has an adverse effect on the environment. CCFLs have a limited average expected operating life of between 10 to 20 thousand hours. Thus, if a monitor using CCFL backlighting is left on for about 2⅓ years (approximately 20 thousand hours of continuous use) one or more of the CCFL tubes within the monitor will most likely fail. Furthermore, as CCFLs age the amount of lumens they produce decreases (i.e., the CCFLs become dimmer over time). Another CCFL aging problem is that dim spots may appear in portions of the CCFL tubes. Over as little as 2.3 years, the picture quality of a CCFL backlit LCD television or monitor may include dim screen portions and an overall lower quality picture.

Another drawback of using CCFLs is that CCFLs must be placed a distance from the back of the LCD screen so that the light emitted from a plurality of spaced CCFL tubes can diffuse in order to provide a substantially uniform brightness across the entirety of the LCD screen. The spacing requirement of CCFLs away from the back of an LCD screen makes the minimum thickness of a large LCD screen monitor or television to be at least three or more inches thick in order to accommodate the cavity space necessary for installing the CCFL backlighting.

More recently with the discovery and advancement of white LEDs, it has been determined that while such LEDs are suitable for backlighting liquid crystal displays. White LEDs generally use a blue LED that includes a phosphor coating thereon. When the blue LED is turned on, the phosphor coating glows a slightly yellow color, which combines with the blue light from the LED. Generally, the combination of the LED's blue light and the yellowish glow of the phosphor creates an overall white light output.

White LEDs (WLEDs) can be placed along the edge of a liquid crystal display screen such that they emit light into a specially designed light guide. The light guide is basically a large piece of plastic positioned behind the LCD display, which receives light photons emitted from the WLEDs into the edges of the light guide and then distributes the light photons, in a substantially uniform fashion, in a direction that is perpendicular and toward the back of the entire LCD screen. Using this type of light guide configuration, an LCD display, monitor or TV using WLEDs for backlighting (or "side lighting") can be manufactured to be significantly thinner than an LCD display incorporating CCFL backlighting technology.

For a medium to large LCD monitor or screen, there may be 50 to more than 200 WLEDs connected in one or more series circuits about the edges of the monitor's light guide. There are basically two methods being commonly used for designing driver circuitry for WLEDs used in backlighting applications in LCD displays. A first method comprises designing a boost circuit or similar switching regulator pre-regulator stage followed by multiple current sinks that regulate the current in one or more strings of LEDs. Although this first method is optimum from a driver circuitry cost point of view, it requires that the LED forward voltages, which are used in any such driver circuitry, to be closely matched in order to avoid high heat dissipation in the current regulator sinks. This issue becomes important in television display and monitor applications where many LEDs must be connected in series.

A second type of driver circuitry commonly used with WLEDs in backlighting applications includes a boost regulator circuit having a high enough output voltage to be able to drive many WLEDs. For example, where 70 or more WLEDs are connected in series, an output voltage required to drive the LEDs can be around 300 volts or more. For a boost regulator to provide a 300 volt output, the input of the boost regulator would need to be around 100 volts. Boost topologies used in the mentioned first and second types of drivers are hard switched, constant frequency circuit design topologies. Furthermore, such hard switched topologies are not suitable for operation at frequencies above about 100 kHz. These hard switched topologies are physically limited to switching frequencies at or below about 100 kHz. To operate at around 100 kHz requires the use of relatively large inductors and filter capacitors. In particular, output capacitor values of 10 µF or more are necessary for such prior boost regulator drivers that have switching frequencies of about 100 kHz when ceramic capacitors, which are customary, are used. These large capacitor values must also be rated for an operating voltage of 350 volts or more, thereby making them relatively expensive components. In addition, when such high valued capacitors (greater than 10 µF) are used there is the potential for the creation of acoustic noise at the pulse width modulated (PWM) dimming frequencies used on the LEDs. PWM dimming frequencies are generally within the human hearing range of 20 to about 2,000 KHz. The acoustic noise of these ceramic high voltage capacitors is exacerbated by the dielectric materials used within the capacitors. The dielectric materials, because of their size, are prone to a piezoelectric acoustic effect, which generates audible sound or sounds emanating from the capacitors.

The prior hard switched boost topologies that provide an output voltage in the range of about 300 to 350 volts (or even higher) have power loss inefficiencies resulting from the continuous charging and discharging of parasitic capacitances associated with the solid state components of the driver circuitry. It is believed that the main parasitic capacitance responsible for power loss is associated with the drain-source capacitance of a switching power MOSFET transistor used within such circuits. For example, a typical MOSFET might have about 100 picofarads (pF) of such parasitic capacitance between its drain to source terminals. If one assumes a 500 kHz switching frequency, the resulting power loss in the form of heat dissipated just due to the MOSFET drain-source parasitic capacitance is:

$$P_{LOSS} = \frac{1}{2}CV^2 f \qquad \text{(Equation 1)}$$
$$= 0.5(100 \text{ pF})(300v)^2(500 \text{ kHz})$$
$$= 2.25 \text{ watts}$$

The above calculation clearly shows that one drawback of hard switched boost topologies operating at switching frequencies above 100 kHz, for example 500 kHz, can result in at least 2.25 watts of power being lost on a continuous operational basis.

Another drawback of hard switched driver circuit topologies is that although it is advantageous to operate such boost regulator circuitry in what is called a Discontinuous Current Mode (DCM), which helps to reduce the output diodes reverse recovery losses, such DCM operation produces severe high frequency spikes and undesirable switching node ringing. Such severe high frequency spikes produce EMI and other electrical noise that is difficult to mitigate and that may have a negative affect on other nearby circuitry.

Figure 1:
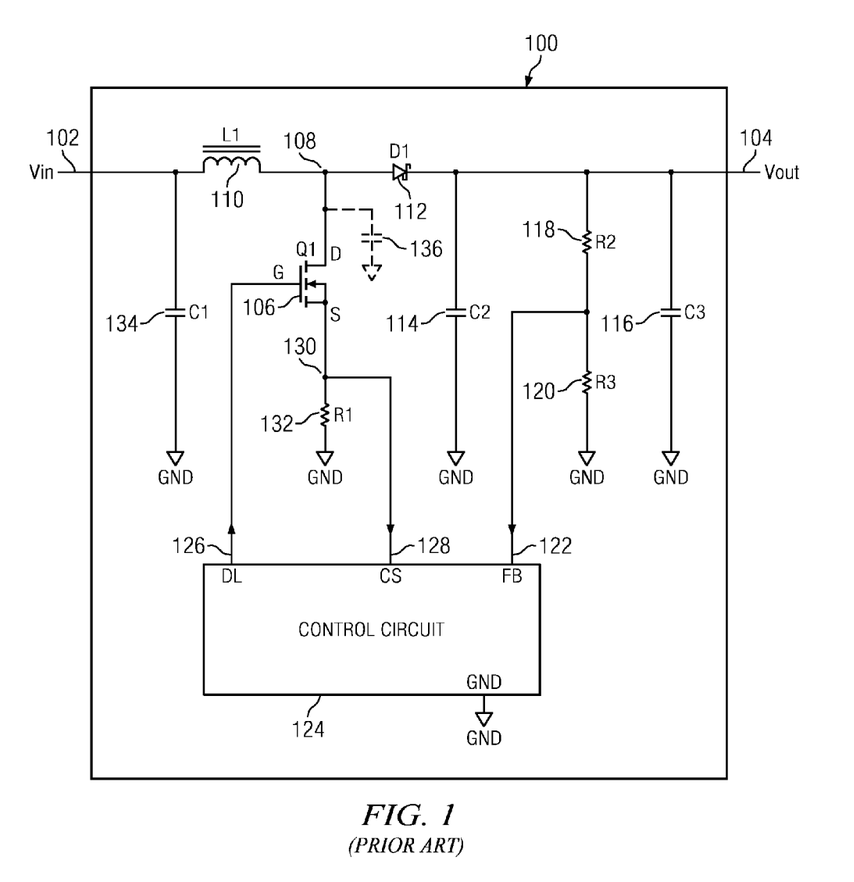
FIG. 1 illustrates a prior art circuit for a hard switched boost regulator.

Referring now to FIG. 1, a prior art boost regulator circuit with boost topology is shown. Basically, a boost regulator 100 has a voltage (V) input 102 of, for example, 100 volts and a V output 104, voltage of about 300 volts. Generally, a boost regulator has a ratio of voltages from $V_{IN}$ to $V_{OUT}$. For the prior art boost regulator 100 we are assuming the $V_{IN}$ to $V_{OUT}$ ratio is 1:3. Certainly, other ratios are readily possible. The basic workings of the prior art boost regulator comprises turning the switching transistor 106 on and off. Turning the transistor 106 on and off will pull the switching node 108 toward ground or 0 volts when transistor 106 is on and then letting the switching node 108 go to the $V_{OUT}$ 104 voltage when transistor 106 is off. As the switching node 108 is switched from ground to $V_{OUT}$ 104, the L1 inductor 110 stores and releases energy. When the energy is released from the L1 inductor 110, the energy is sent through a D1 diode 112 providing voltage increase or boosted voltage at the output 104, as measured across C2 capacitor 114 and/or C3 capacitor 116.

C2 and C3 capacitors 114 and 116 are used to smooth out the output voltage 104 as the D1 diode 112 is turned on and off to deliver the energy stored in the inductor 110 in a pulse shaped current form.

A voltage divider circuit comprising R1 resistor 118 and R2 resistor 120 is connected to the $V_{OUT}$ 104 node and provides a Feedback (FB) voltage 122 to a control circuit 124.

The control circuit 124 measures the feedback voltage 122 in relationship to a voltage reference to make sure that the output voltage 104 is within a predetermined range. The feedback circuit within the control circuit 124 attempts to regulate the output voltage to a steady voltage.

The DL output of the control circuit 124 provides a gate driver signal 126 to the gate of the switching FET 106. The Current Sensor (CS) input 128 of the control circuit 124 is a current sense input that reads a voltage at the current sense node 130. The sensed voltage is created by a current flowing from the source of the switching FET 106 through the R1 resistor 132. The current sense signal 128 is used by the control circuit 124 to help determine when to turn the switching FET 106 off via the switching signal 126. The CS signal 128 is also used by the control circuit 124 to sense when or if there is an over current condition through the source of the switching FET 106. If an over current condition exists through the switching FET 106 then the control circuit turns off the switching FET 106 via the switching signal 126.

In prior boost regulators having a similar topology as is shown in FIG. 1, the switching frequency of the switching transistor 106 is intended to be as high as possible. But, due to power loss and circuit design limitations, the switching frequency of such prior boost regulator circuits has been limited to a frequency of about 100 kHz to perhaps 250 kHz.

One reason for wanting to operate the switching frequency as high as possible is that the components, being the inductor 110 and the C2 and C3 capacitors 114 and 116 can be smaller in size and be lower induction (Henry) and capacitance (Farad) value components, if the boost regulator is operated at higher and higher frequencies. The component sizes of the inductor 110 and the capacitors 114 and 116 can be decreased at the higher switching frequencies while the voltage boost ratio from the voltage input 102 to the voltage output 104 is maintained. In other words, theoretically the higher the operating switching frequency, the smaller the reactive components required to produce the same power from $V_{IN}$ 102 to $V_{OUT}$ 104.

Given the basic circuit design of the prior boost regulator 100, there are physical limitations associated with an increase in switching frequency that limit how high the switching frequency can go even as the reactive components (C1, C2 and C3 capacitors 134, 114 and 116 and the inductor 110) are decreased in size and value. The switching frequency limitations of the prior boost regulator circuit have to do with the parasitic capacitances associated with the MOSFET or switching transistor 106, the inductor 110 and diode 112.

In electrical circuits, parasitic capacitance is the unavoidable and usually unwanted capacitance that exists between the parts of an electronic component or circuit simply because of their proximity to each other. All actual circuit elements such as inductors, diodes, and transistors have internal capacitance, which can cause their behavior to depart from that of "ideal" circuit elements. For example, an inductor often acts as though it includes a parallel capacitor, because of its closely spaced insulated conductive windings. The inductor windings act like plates of a capacitor and store a charge. Any change in the voltage across the inductive coil requires extra current to charge or discharge the parasitic capacitance therein. When the voltage does not change very quickly, as in low frequency circuits, the extra current required is usually negligible, but when the voltage is changing at higher and higher frequencies, the extra current becomes a large quantity and can dominate the operation of the circuit. In a transistor, such as the switching transistor 106, there is a parasitic capacitance that exists between the gate and drain, the gate and source, and the drain and source leads of the device.

These parasitic capacitances in the transistor are formed at the junctions of the semiconductor materials within the transistor device. Furthermore, a parasitic capacitance will exist in the diode 112.

Parasitic capacitances for the switching transistor may range, for example, from about 50 picofarads to about 300 picofarads for the three parasitic capacitances (i.e., gate to drain, drain to source, and source to gate parasitic capacitances). For the diode 112 the parasitic capacitance associated with the semiconductor junction therein may be anywhere from about 50 to about 100 picofarads.

The switching node 108, which is the same node as the drain connection of the switching transistor 106, may have a total equivalent parasitic capacitance associated with it of from about 200 to about 300 picofarads. This node, the switching node 108, has been given this name because as the switching transistor 106 is turned on and off by the switching signal 126, the switching node is switched or pulled from a low potential to a high potential and back again at the switching frequency. The switching node 108 is pulled essentially to ground when the transistor 106 is on and then quickly switched to about the output voltage 104 (plus, for example, the voltage drop across the diode 112) when the switching transistor 106 is turned off. As this switching process between, for example, virtually 0 volts to about 300 volts occurs the charge on the parasitic capacitance 136 associated with the switching node 108 must charge and discharge at the frequency of the switching process. As shown above in Equation 1, the power loss associated with the charging and discharging of the parasitic capacitance of a typical MOSFET may be around 2.25 watts or more assuming a 500 kHz switching frequency. This power loss is discharged in the form of heat dissipation. The higher the switching frequency the higher the power loss in the form of heat.

Furthermore, in addition to the power loss and heat dissipation, the switching transistor 106 is encountering and being driven from a very high voltage to a very low voltage and vice versa at the switching frequency. It is also enduring being switched from a very high current flow to a zero current flow and vice versa as it switches. While the transistor 106 is switching from a low voltage to a high voltage and vice versa there is a moment therein that there is both a very high voltage and a very high current flow across and through the drain and source portions of the transistor 106. If this high voltage and high current found across and through the switching transistor is integrated over time, one finds that it is the source of an additional power loss called the "switching loss" of the transistor. This power loss occurs during the switching time as the transistor switches on and off. The switching time of the switching transistor 106 may occur in the range of about 30 to about 75 nanoseconds. Referring back again to Equation 1, power loss is equal to one-half of the current times the voltage squared $P_{LOSS}=\frac{1}{2}CV^2f$. Thus it is easy to see as switching frequency increases the amount of power loss also increases. As the switching frequency of the switching transistor 106 increases, the inefficiency of the hard switched boost regulator 100 also increases. There is a balance that must be made between increasing the switching frequency of a hard switched boost regulator, which allows the reactive components of the boost regulator to be smaller and smaller, but which increases the power loss or inefficiency of the same circuit. So a design decision must be made between how high a frequency to operate the device 100 with smaller components at a lower cost balanced against an amount of energy or power loss in the form of heat that can be accommodated.

What is needed is a boost regulator circuit design that allows the circuit to operate at frequencies above 200 or 250 kHz without the boost regulator circuit suffering from reactive or parasitic power losses at the higher switching frequencies.

Another drawback associated with the prior hard switched boost regulator circuits is that the gate switching signal 126 requires a strong driver circuit within the control circuit 124, due to the high voltage swing of the drain-gate capacitance of the switching transistor 108.

Yet another drawback of the prior boost regulator circuitry is due to the diode recovery losses in the D1 diode 112. The D1 diode 112 is turning completely on and then turning completely off while encountering high voltage changes. In essence, the diode is going from a completely on state and then in an instant, when the switching transistor 106 turns on, the D1 diode 112 is reverse biased and switched off. Of course, in reality, there is no such thing as a diode instantly turning on and instantly turning off. Diodes have a significant parasitic capacitance, which in our example is being charged to 300 volts when the switching transistor is off and then must discharge the 300 volts and go to ground when the switching transistor 106 is hard switched turned on. Reverse biasing a diode that has a very large voltage potential in a very short period of time causes the diode's parasitic capacitance charges to have to dissipate extremely quickly. As a result, for a few nanoseconds the diode, as it is switching, is actually in a virtual short circuit state while the charges in the parasitic capacitance of the diode are being charged or discharged. During the instant that the virtual short exists across the diode, a very high voltage and a very high current exist therein, which not only must be dissipated as power loss heat, but also creates severe high frequency spikes of current. These very high frequency spikes of current travel and ring through the D1 diode 112 as well as through the switching transistor 106 via the drain connection to the switching node. These high frequency current spikes also result in emitting switching noise in the form of electromagnetic interference (EMI), which is transmitted by the circuit and could be coupled or picked up by other nearby unrelated circuitry. Such EMI coupling could potentially cause circuit malfunctions or dropped data in other circuits.

Yet another negative aspect of prior boost regulator circuitry 100 may be noise produced in the large high voltage ceramic capacitors such as C2 capacitor 114 and C3 capacitor 116. These high voltage capacitors are not only expensive, but because of their high values and large size, which is required for operating at 100 to 200 kHz frequencies, the dielectric plates within the high voltage ceramic capacitors produce a piezoelectric acoustic noise generated due to a Pulse Width Modulated (PWM) DIM frequency used in many LED applications for brightening and dimming the lumen output of the LEDs (not specifically shown). Since the PWM DIM frequency used for dimming and brightening the LEDs is usually in the 20 to 20,000 Hz frequency range, the piezoelectric acoustic noise generated by the high voltage ceramic capacitors is within the hearing range of humans who may be near the electronic device. Of course, such noise is undesirable if emitted from a television, monitor or other LCD display device. It should be noted that electrolytic capacitors are generally not desirable and whenever possible avoided in such prior circuits because their life span is much shorter than the high voltage ceramic capacitors. Furthermore, electrolytic capacitors are much larger and bulkier than ceramic capacitors.

What is needed is a boost regulator circuit or a boost driver circuit for white LEDs for use in backlighting applications that can operate at frequencies exceeding 200 kHz (200 kHz to about 2 MHz) so that the size and cost of the reactive components in the circuit can be decreased without an inefficiency produced in the circuit due to $CV^2$ (power) losses from parasitic capacitances and transistor switching losses of the circuit. Furthermore, it would be desirable to have such a high frequency boost regulator that minimized the diode recovery losses and severe high frequency spikes or EMI created by a switching diode during reverse biasing along with elimination of any piezoelectric acoustic noise generated on the high voltage ceramic capacitors due to PWM DIM switching frequencies causing current modulation of the output voltage when prior hard switched boost regulator circuits are used in LED lighting or other power supply management device applications.

SUMMARY

Embodiments of the present invention provide a boost regulator circuit that is adapted to switch during a critical conduction period. The critical conduction period is the moment when the current through and inductor within the boost regulator circuit is at or substantially near zero and perhaps may have a small negative current flow therethrough. At the critical conduction period the switching node of an exemplary boost regulator circuit is at or near zero or virtual zero volts. When a control circuit senses that the boost regulator circuit's switching node has a voltage that is substantially close to zero (0) volts and is nearing the end of the inductor's energy delivery cycle, then the control circuit provides a switching signal to a switching transistor (e.g., For example a MOSFET) in the exemplary boost regulator circuit. By switching the boost regulator circuit when the switching transistor's drain node is substantially at a low or zero voltage, the switching losses and the $CV^2$ power losses are substantially eliminated thereby decreasing the amount of power loss in the form of heat and increasing the efficiency of an exemplary boost regulator circuit.

Embodiments of the invention provide a boost regulator circuit comprising an inductor that is adapted to receive a voltage input on one side of the inductor and be connected to a switching node of the exemplary boost regulator circuit on the other side. A switching transistor is connected such that its drain is connected to the switching node, its source is electrically connected to ground, and its gate connection is connected to a control circuit. A diode is included such that the anode side of the diode is connected to the switching node and the cathode side of the diode is connected to a voltage output node of the exemplary boost regulator circuit. The control circuit has a connection or pin, for example named zero transition sense (ZTS), that is connected to the switching node either directly or through a voltage divider. The control circuit also has a switching signal output that is connected to the gate of the switching transistor. The control circuit is adapted to provide a switching signal to the gate of the switching transistor when the ZTS connection senses that the switching node is substantially near a low or ground voltage. When the switching node is sensing that the switching node is substantially near the low or ground voltage, the exemplary boost regulator circuit is switching under substantially zero voltage conditions.

An embodiment of the invention may further comprise a resistor/capacitor voltage divider that is connected between the switching node and the ground. Such a voltage divider reduces the magnitude of the sensed voltage at the ZTS connection or pin.

Embodiments of the invention provide a boost regulator that has a switching frequency between 100 kHz and 10 MHz. Exemplary boost regulators operating within this frequency range may utilize components that have a smaller physical size than prior art boost regulators operating at or in a lower frequency range.

In yet additional embodiments of the invention, the control circuit comprises a feedback voltage compare circuit that is electrically connected to the output node of the exemplary boost regulator. The feedback voltage compare circuit is adapted to compare a feedback voltage with a reference voltage and provide a voltage comparison output. The control circuit further includes a gate driver circuit that receives the voltage comparison output. The gate driver circuit is adapted to adjust the duty cycle of the switching signal that is provided to the gate of the switching transistor via the switching signal output of the control circuit. By varying the duty cycle of the switching signal, the control circuit can control the output voltage, via feedback, to be within a predetermined output voltage range.

Additional embodiments of the invention provide a boost regulator circuit that comprises a control circuit. The control circuit comprises a gate driver logic circuit that is adapted to provide a switching signal to a gate of a switching transistor within the boost regulator circuitry. The control circuit further comprises, for example what can be called, a zero transition sense circuit that is adapted to sense a switching node voltage of the boost regulator circuit. The zero transition sense circuit determines when the switching node voltage is substantially low, near a minimum or near ground voltage. The zero transition sense circuit, along with perhaps associated circuitry, is configured to provide a high level turn-on signal to the gate driver logic circuit when the switching node voltage reaches a substantially low, minimum or near ground voltage as determined by the control circuit's internal threshold or, in some embodiments, by a user or circuit designer's threshold setting.

In additional embodiments of the invention, the boost regulator circuit may further comprise a first capacitor connected on a first side to the switching node of the boost regulator circuitry and further being electrically connected on a second side of the capacitor to ground. The boost regulator circuit further comprises a second capacitor that is connected between the second side of the first capacitor and ground. Furthermore, in some embodiments, the boost regulator circuit may have a zero transition sense circuit that is electrically connected to a node located between the first capacitor and the second capacitor.

In additional embodiments of the invention, a boost regulator circuit is provided that utilizes a method of determining when to switch a switching transistor from an off state to an on state. The method comprises sensing, by a control circuit, that a switching node voltage is substantially low, minimum or near ground voltage. Upon sensing that the switching node voltage is a substantially low voltage, the method further provides that a switching signal is provided, by the control circuit, to a gate of a switching transistor. The switching signal turns the switching transistor on for a determined amount of time. The determined amount of time is dependent upon the boost regulator circuit's output voltage feedback as well as the amplitude of the sensed voltage at the source of the switching transistor both of which may be feedback signals that are used to generate the duty cycle of the switching signal.

The above summary of the invention is not intended to represent each embodiment or every aspect of the invention.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a critical conduction resonant transition boost power circuit are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
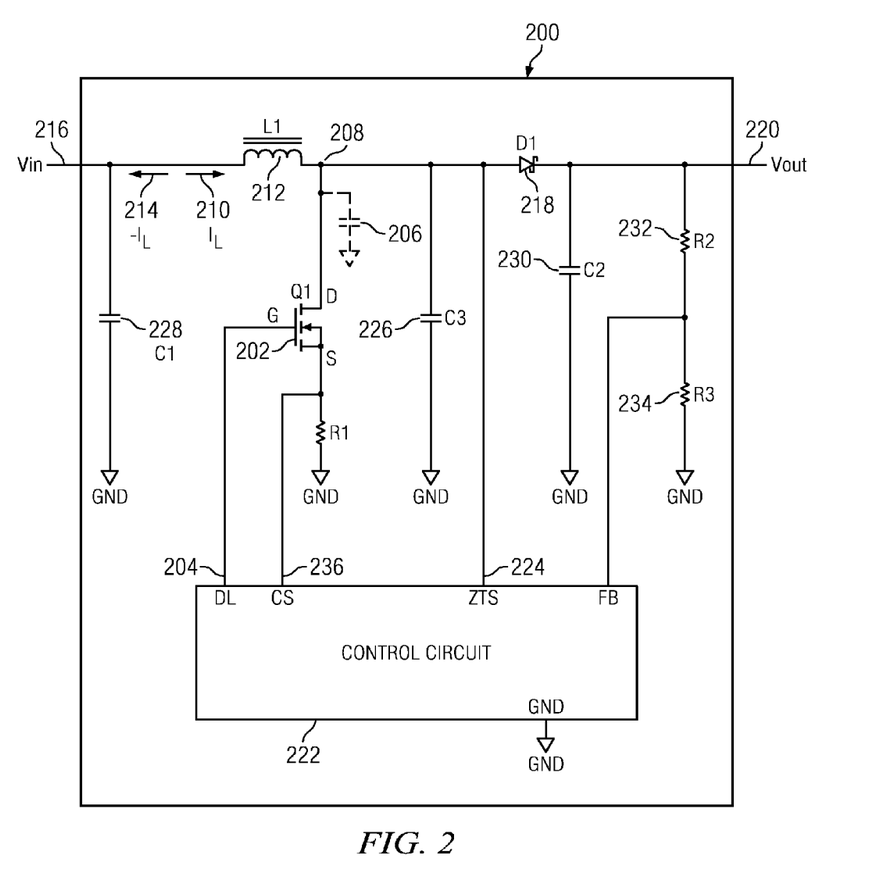
FIG. 2 illustrates an exemplary critical conduction resonant transition boost power circuit.

Referring now to the drawings where like or similar elements are designated with identical reference numerals throughout the several views, and wherein the various elements depicted are not necessarily drawn to scale, and in particular, to FIG. 2 where there is shown a circuit diagram of an exemplary boost power circuit or boost regulator 200 that utilizes teachings of the present invention, embodiments of the invention will now be described. In one embodiment the energy loss associated with the charging and discharging of the parasitic capacitance associated with the switching transistor (or MOSFET) 202 and switching diode 218 is minimized or eliminated by discharging such parasitic capacitance prior to turning the switching transistor 202 on with the switching signal 204. In order for an embodiment to be able to discharge the transistor drain parasitic capacitance 206, which is represented by an equivalent parasitic capacitance of the drain lead of the switching transistor 202, one could switch the transistor 202 on with the switching signal 204 when the drain/source voltage is at a minimum. To accomplish this in various embodiments of the invention, the current $I_L$ 210 which flows through the L1 inductor 212 is generally moving in a $V_{IN}$ to $V_{OUT}$ direction, but momentarily is allowed to go to zero and perhaps move in a slight negative $I_L$ 214 direction. This momentary zero current flow and perhaps small negative current flow shall be referred to as a period of critical conduction for the inductor 212. It should be understood that in the prior general circuit of FIG. 1, the current flowing through the inductor 110 only flows in one direction (from $V_{IN}$ toward $V_{OUT}$) due, in part, to the hard switching of the switching transistor 106 by the control circuit 124. The current through the prior inductor 110 does not flow in the opposite or negative direction. In other words, there is always a positive current inductor flow in FIG. 1 from $V_{IN}$ to $V_{OUT}$ or from $V_{IN}$ through the switching transistor 106.

Referring back to FIG. 2, in order to accomplish a discharge of the parasitic capacitor 206 prior to the switching transistor 202 turning on, the following sequence of events should occur. First, when the current 210 through the inductor 212 ramps up in a linear fashion due to the switching transistor 202 is turned on. The direction of the inductor current 210 is from input to output as it builds up. The current through L1 inductor 212 builds up linearly from input to output with a slope equal to approximately V/L where V is equal to the input voltage 216 and L is equal to the inductance of the L1 inductor 212. When the switching transistor 202 is then turned off, the inductor current 210 that has built up on the inductor 212 has to continue to flow. In order to continue to flow the D1 diode 218 is turned on and connects the $V_{IN}$ 216 through the inductor 212 to the V output 220. For example after diode 218 turns on, if $V_{IN}$ at the input 216 is 100 volts and the boosted voltage is 300 volts at the output 220, except for the small voltage across the D1 diode 218, the inductor 212 encounters about a 200 volt voltage drop across its terminals, which is reversed in polarity from what the two terminals of the L1 inductor 212 encountered when the switching transistor 202 was on (i.e., 100 v at $V_{IN}$ 216 and ~0 volts at the switching node 208). This exemplary 200 volt voltage across the L1 inductor 212 will cause the $I_L$ current 210 to decay and decrease toward zero. At some point in time the current $I_L$ 210 will decrease until it is a zero current. As the current $I_L$ 210 approaches zero, the D1 diode 218 becomes reversed biased and turns off. When D1 diode 218 is reversed biased and turns off the switching node 208 is momentarily still at the same $V_{OUT}$ output voltage 220, which in this example is, about 300 volts. At this moment and for a short period of time, a negative $I_L$ 214 will begin to flow through the L1 inductor 212 since the potential of the switching node 208 is still greater than the $V_{IN}$ voltage 216. This negative flow of current through L1 discharges the voltage of switching node 208 towards the ground potential or zero volts.

Embodiments of the invention sense when the voltage at switching node 208 reaches a predetermined low, minimum, substantially low or near ground potential voltage. The control circuit 222 has a Zero Transition Sense (ZTS) 224, which senses the voltage of the switching node 208 in order to determine the moment that the switching node potential is at or very close to zero volts. It is important to note that at the moment when the switching node 208 has a potential at or about zero volts, the parasitic capacitance 206 will at a substantially low, minimum or discharged state. Also, at this moment, the voltage and current, relative to the drain and source, are both at or near a minimum or zero. The power loss (the $CV^2$) being dissipated through the switching transistor 202 is at or near zero since there is a minimal voltage difference across or current flow through the drain and source leads of the switching transistor 202. Switching losses of the transistor 202 are essentially eliminated if the transistor is switched at this moment. Furthermore, at this moment the drain-gate parasitic capacitance (not specifically shown) of the switching transistor 202 is also in a discharged, minimum or substantially zero voltage state. Thus, the switching transistor 202 does not require a large amount of gate charge to be delivered from the control circuit, via switching signal 204 resulting in further power savings.

So essentially, if switching of the switching transistor 202 takes place substantially at or immediately after the critical conduction moment, the switching loss and the $CV^2$ power losses will have been substantially eliminated and the load on the DL gate driver circuit within the control circuit 222 will be decreased (as compared with a prior hard switched circuit). Furthermore, the parasitic capacitance of the D1 diode 218 will be substantially discharged because the diode is not forced to switch off (i.e., be hard switched) when the switching transistor 202 is turned on. Instead the D1 diode 218 is switched due to the resonance action (the current 210 and/or 214 increase and decrease) through the inductor 212 along with the switching transistor 202 not being given a signal to turn on until the voltage of the switching node 208 is sensed by the ZTS 224 of the control circuit 222 to be at a substantially low, minimum or zero voltage.

As such, the time to start the next ON cycle of transistor 202 is being determined by sensing when the switching node 208 is at or substantially near ground or zero volts. Each time the switching node 208 is sensed to be at or substantially near ground potential, the control circuit 222 provides a DL transistor switching signal 204 to turn the switching transistor 202 on.

In some embodiments of an exemplary resonant transition boost power circuit 200, an additional capacitor 226 is provided between the switching node 208 and ground. It would be understood by those of ordinary skill in the art at the time this invention was conceived that placing a capacitor 226 between the switching node and ground in the prior circuit of FIG. 1 would increase the total capacitance of the switching node by adding the capacitance of capacitor 226 to the parasitic capacitance 136 of FIG. 1, which would result in larger power loss and other negative attributes to be associated with the prior hard switched boost regulator design 100 as the switching frequency increased. Conversely, in various embodiments of the present invention, adding a capacitor 226 between the switching node 208 and ground has been found to be advantageous. The reason that the addition of the capacitor 226 (switching node capacitor) is advantageous is that it can be used to stabilize the circuit by providing a specific value of capacitance between the switching node and ground rather than depending on the inherent parasitic capacitance 206 of the switching transistor 202. Furthermore, the inherent drain to ground parasitic capacitance 206 of the transistor 202 may not be large enough to provide for proper circuit operation. Switching node capacitor 226 may be considered an optional capacitor that may be used in some embodiments of the invention and may not be utilized in others. Estimated values for the switching node capacitor 226 may be in a range from about 25 to 500 picofarads. It should also be noted that in certain embodiments capacitor 226 may consist of the series combination of two capacitors. This series connection of capacitor 226 is advantageous for example when forming a capacitive voltage divider for the purpose of reducing the voltage applied to the control circuit 222. Furthermore, in some embodiments these capacitors may be shunted by resistors.

Furthermore, it should be understood that embodiments of the present invention provide a voltage boost or voltage increase from $V_{IN}$ 216 to $V_{OUT}$ 220. For example $V_{IN}$ may be 5 volts and $V_{OUT}$ may be boosted to 15 volts or $V_{IN}$ may be 10 volts and $V_{OUT}$ may be boosted to 60 volts. For example input to output voltage ratios may be from about nearly 1:1 to 1:100. Embodiments of the invention may be configured, for example, to receive an input voltage of between about 10 to 300 volts DC and boost the input voltage to a regulated output voltage of between about 20 to 500 volts DC.

Since embodiments of the invention do not have substantial negative aspects associated with the parasitic capacitances associated with the L1 inductor 212, the switching transistor 202 and the D1 diode 218 resulting in less $CV^2$ power losses, switching losses and ringing or EMI spikes from the D1 diode 218, embodiments of the invention can be operated at frequencies substantially higher than the limited frequencies (lower than ~200 kHz) of the prior boost regulator circuits. Exemplary boost regulator circuits that utilize the resonant transition and the critical conduction techniques in accordance with exemplary teachings of the present invention may be operated at frequencies exceeding 200 kHz and well into the 2 MHz switching frequency range or in some cases even at much higher frequencies, being as high as about 10 MHz. Furthermore, the component values for L1 inductor 212, input voltage capacitor 228 and output voltage capacitor 230 can be significantly decreased at the higher switching frequencies. A decrease in these component values also essentially decreases the size of these reactive components as well as their cost without decreasing the potential voltage boost ratio of an exemplary resonant transition boost regulator or power circuit 200. It is further envisioned in practical circuits that the switching signal frequency of the control circuit DL output or the switching signal 204 will be in a range of between about 100 kHz and about 2 MHz.

In additional embodiments, the duty cycle of the switching signal 204 can be varied to alter the amount of boost or voltage increase ratio of an exemplary boost regulator or power circuit 200. For example, the longer the period of time that the switching transistor 202 stays on during the duty cycle, the higher the output voltage 220 is compared to the input voltage 216. Perhaps the ratio of $V_{IN}$:$V_{OUT}$ may be as high as 1:30, 1:40 or 1:100 or more in an extreme duty cycle situation. Conversely, when the switching transistor 202 is kept off most of the time during the duty cycle and turned on for a very short period of time, for example turned on only for 1% of the duty cycle time, then the ratio of $V_{OUT}$ 220 to $V_{IN}$ 216 is almost equal to 1. The, selection of the inductor 212 can be used to set the running frequency of an exemplary device.

Figure 3A:
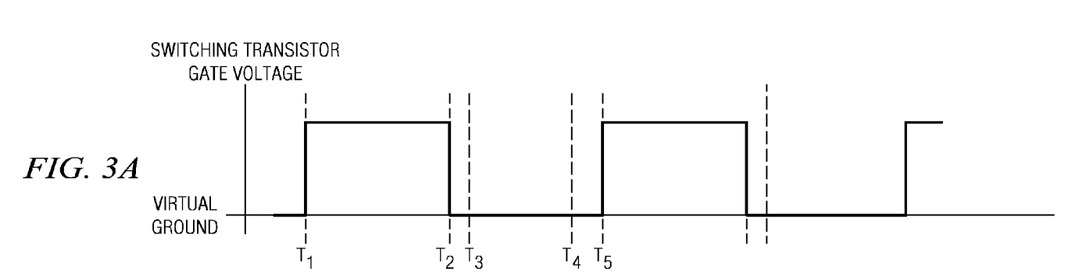
FIG. 3a illustrates an exemplary graph of a switching transistor gate voltage or switching signal in accordance with an embodiment of the invention.
Figure 3B:
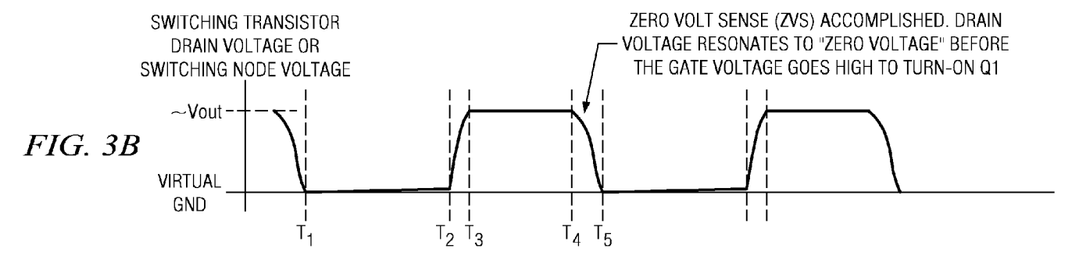
FIG. 3b illustrates an exemplary graph of a switching transistor drain voltage or switching node voltage of an embodiment of the invention.
Figure 3C:
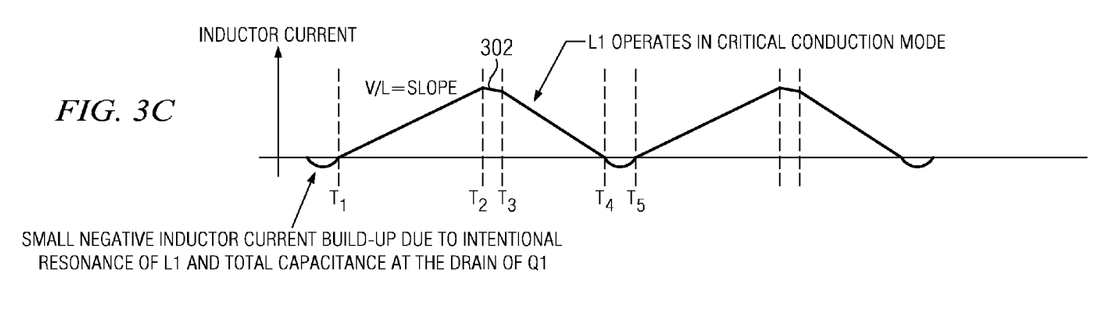
FIG. 3c illustrates an exemplary graph of current flow through a switching inductor in accordance with an embodiment of the invention

Referring now to FIG. 3A, FIG. 3B and FIG. 3C, FIG. 3A provides an exemplary wave form of an exemplary switching signal 204 that is provided from the control circuit 222 to control the gate of the switching transistor 202. The switching signal has high level, which correlates to the switching transistor's ON-time between, for example, $T_1$ and $T_2$. The switching signal also has a low level, which correlates to the switching transistor's Off-time between for example, $T_2$ and $T_5$. FIG. 3B provides a graph of an estimation of the switching transistor's 202 drain voltage also known as the switching node 208 voltage. FIG. 3C provides a current graph showing an estimation of the positive $I_L$ current 212 and momentary negative $I_L$ current 214 seen in the L1 inductor 212. Looking at time $T_1$, the gate voltage is high, which turns on the switching transistor 202. While the switching transistor is on, the current through the inductor 212 is increasing with a slope equal to about V/L where V is equal to $V_{IN}$ and L is equal to the inductance of the inductor 212. At time $T_2$ when the switching signal goes low and turns the switching transistor 202 off, the switching node 208 voltage ramps up very quickly, but not instantaneously because of parasitic capacitances of the system. Thus, it takes a certain amount of time, perhaps a few to hundreds of nanoseconds (the time between $T_2$ and $T_3$) to raise the switching node voltage from zero volts to nearly the output voltage. The difference between the maximum switching node voltage and the $V_{OUT}$ voltage being an amount near to the voltage drop across the D1 diode 218. Also between time $T_2$ and $T_3$, a minimal amount of inductor current 302 is required or lost during the voltage increase of the switching node voltage. The D1 diode 218 turns on at or substantially near to time $T_3$, due to the current 210 not being able to go through the switching transistor 202 any longer and needing to travel through the diode 218. When the diode 218 turns on there is a decay in the L1 inductor 212 current between time $T_3$ and $T_4$. In various embodiments the slope of this decay is substantially equal to the quantity ($V_{OUT}$ minus $V_{IN}$) divided by the inductor value.

At some point in time, the inductor current decays to zero, which is designated by time $T_4$. At or substantially near the moment that the inductor current 210 becomes zero, the D1 diode 218 becomes reverse biased and turns off. When the diode 218 turns off, the parasitic capacitance 206 or the parasitic capacitance 206 in combination with the switching node capacitor 226, which are charged to the output voltage 220, are discharged via a negative inductor current 214 for a very short period of time of a few to a few hundred nanoseconds between times $T_4$ and $T_5$. As the parasitic capacitance and/or the switching node capacitor discharge, the switching node voltage drops quickly to zero. Thus, the inductor current 210 goes to zero and may change direction to momentarily become current 214, meanwhile the switching node voltage seen at the switching node 208 also goes substantially to zero volts at time $T_5$. The control circuit 222 then senses the virtual zero potential of the switching node at time $T_5$ and triggers or drives the switching signal 204 to go high, which turns on the switching transistor 202 starting a new on cycle.

During the time period between $T_4$ and $T_5$, energy from the parasitic capacitor and/or the switching node capacitor 226 is being transferred to the inductor 212 in the form of current. The time between $T_4$ and $T_5$ may be referred to as the resonant transition moment or time period.

As such, embodiments provide a boost regulator that operates in a critical conduction mode and in zero voltage transition of the switching node and switching transistor gate voltage enabled by the charging and discharging of the switching inductor 212 and the switching node capacitance. The critical conduction moment may be defined herein as the time period when the inductor current 210, 214 goes close to zero, or perhaps slightly negative, before the next switching cycle begins. In other words, a critical conduction moment is when the current moving through the inductor of an exemplary boost regulator goes to zero (critical conduction) or in a slightly negative or reverse direction for at least a portion of each switching cycle of the boost regulator. Furthermore, the zero current or slight current reversal seen or measured in the inductor 212 occurs at a resonant frequency in accordance with the inductor value and the capacitance associated with the switching node 208. In yet other embodiments, the voltage of the switching node discharges to a low voltage or near zero voltage at least in part due to discharge through the switching inductor 212.

Embodiments comprise a control circuit 222 that senses the voltage of the switching node and provides a switching signal 204 to the switching transistor 202 when the switching node voltage is substantially near ground potential. By switching the switching transistor when the switching node is substantially near ground potential, the charge on the parasitic capacitances and other capacitances associated with the switching inductor, the switching diode, and the switching transistor are so small that they may be considered substantially zero or at an insignificant level thereby substantially eliminating the power losses and switching losses that are a limiting factor of prior hard switched boost regulator power circuits.

Figure 4:
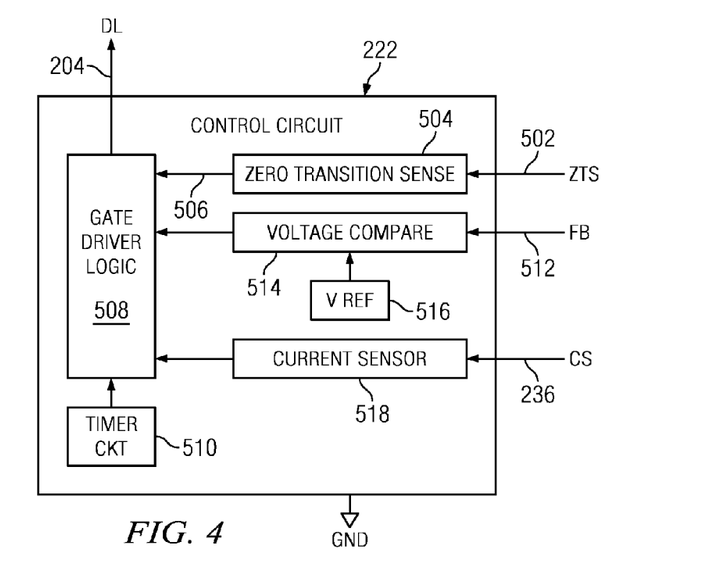
FIG. 4 illustrates a block diagram of an exemplary control circuit.

Referring now to FIG. 4, an exemplary block diagram of a control circuit 222 is provided. A zero transition signal 502 (ZTS) is received from the switching node 208. The zero transition signal 502 is interpreted by the zero transition sense circuit 504 to determine whether the voltage sensed at the switching node is substantially near a zero voltage. If the zero transition sense circuit 504 senses a near zero or other predetermined voltage via the ZTS input 502, then a zero voltage signal 506 is provided to the gate driver logic circuit 508. A timer circuit 510 provides a timing signal to the gate driver logic circuit 508. In some embodiments, the zero voltage signal 506 indicates to the gate driver logic that a switching signal 204 should be sent to turn on the switching transistor 202. A feedback voltage 512 is received by the control circuit 222. The feedback voltage 512 provides an indication of the output voltage at $V_{OUT}$ 220. This feedback voltage 512 is provided to a voltage compare circuit 514, which compares the feedback voltage 512 with a reference voltage provided from a voltage reference circuit 516. The voltage reference circuit 516 may be adjustable or programmable to provide a range of reference voltages. Exemplary voltage compare circuits 514 may comprise an amplifier circuit that amplifies the difference of a reference signal provided by the voltage reference circuit 516 and feedback signal 512. The output of the voltage compare circuit 514 is sent to the gate driver circuit 508 so that the gate driver logic circuit can adjust the duty cycle of the switching signal 204 and keep the output voltage at or near a steady state voltage or within a predetermined voltage range. A current sense signal 236 provides a voltage indicative of the current flow through the switching transistor 202 and is received by the control circuit 222. This current sense signal can be used for adjusting the on time of the switching transistor 202. The current sense voltage 236 is provided to the current sensor circuit 518, which determines if the current flow through the switching transistor 202 is too high or above a predetermined value. If the current sensor circuit determines that the sensed current through the switching transistor is above a predetermined limit then a signal is provided to the gate driver logic circuit 508, which will turn off the transistor 202 in order to stop current flow through the switching transistor 202.

Figure 5:
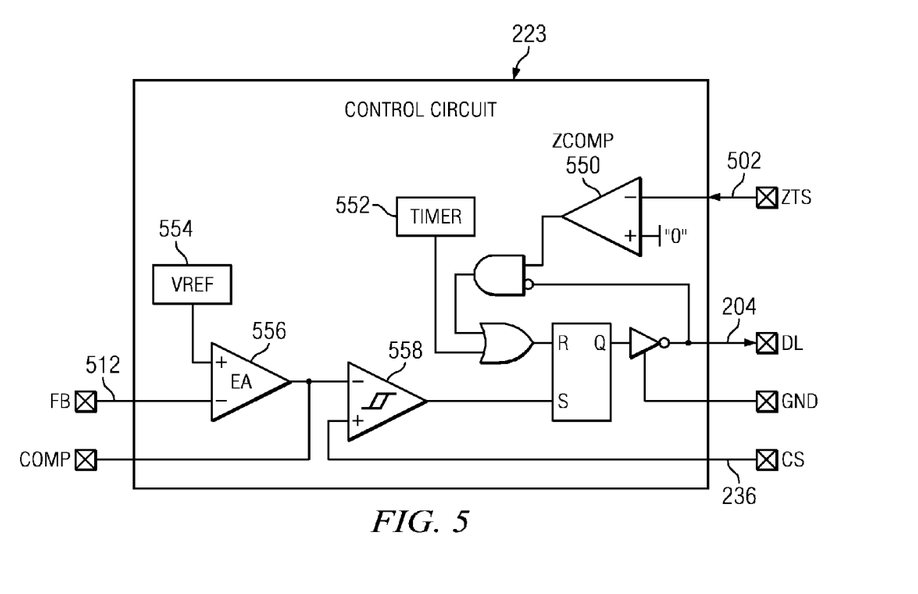
FIG. 5 illustrates a more detailed block diagram of an exemplary control circuit.

Referring now to FIG. 5, another exemplary control circuit for use in an exemplary embodiment is provided. Here the control circuit 223 depicts a basic logic and component schematic for another exemplary control circuit 223. A ZTS signal 502 can be provided to the control circuit 223 and received by a comparison amplifier or comparator 550, which determines whether the ZTS signal 502 is at a substantially low or near zero voltage that is below a predetermined threshold voltage. The output of the zero voltage comparator 550 is combined with logic circuitry to produce a gate driver signal or switching signal 204. A voltage reference circuit 554 is used with another comparison amplifier 556 to sense whether the feedback signal 512 is above or below a desired output voltage. A current sense voltage 236 is provided to a comparator 558, which determines whether the current sense voltage 236 is within an acceptable range for the particular switching transistor's drain to source current limitations. The comparator 558 provides an output that adjusts the end of the high level of the switching signal 204 or overall ON-time of the switching transistor (See FIG. 3A).

Figure 6:
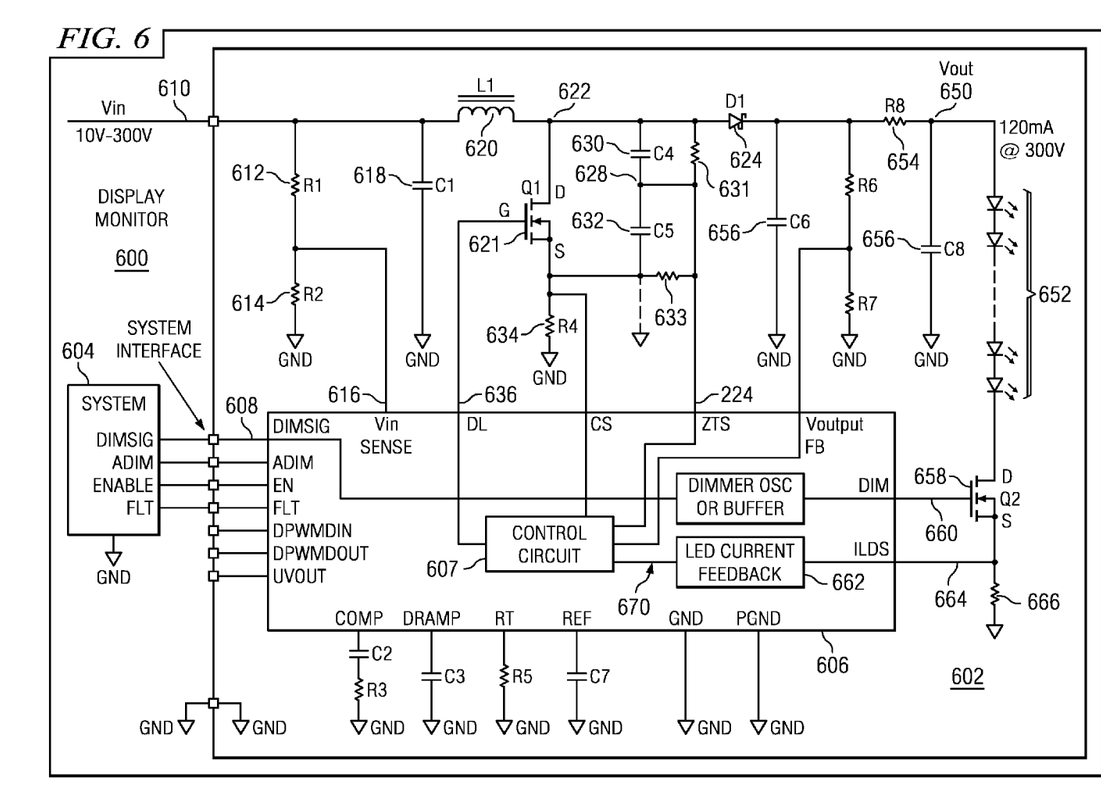
FIG. 6 illustrates a circuit diagram of an exemplary implementation of a WLED driver used in a display monitor comprising an exemplary resonant transition boost LED driver in accordance with an exemplary embodiment of the invention.

FIG. 6 depicts a circuit diagram of an LCD display backlight circuit 600 that utilizes LED light sources to backlight the LCD display and that contains an exemplary resonant transition boost LED driver or power circuit 602 in accordance with exemplary teachings of the invention. The display backlight control system 604 provides control signals to the LED control circuit 606. One of the signals provided by the backlight control system 604 is a DIM signal 608. An input voltage 610 is provided to the input side of the exemplary critical conduction resonant transition boost LED driver 602. An exemplary input voltage may be in the range of about 10 volts to about 300 volts DC. The input voltage is sensed at a voltage input sense 616 of the LED control circuit 606 via a voltage divider circuit comprised of R1 and R2 resistors 612 and 614. An input voltage smoothing capacitor 618 is provided on the input side of the switching inductor 620. The switching transistor 621 has its drain attached to the switching node 622 and the anode side of the switching diode 624. In this embodiment, a control circuit 607, that is similar to control circuits discussed in FIGS. 2, 4 and 5 is comprised within the LED control circuit 606. Furthermore, the zero transition sensed input 224 to the LED control circuit 606 is not connected directly to the switching node 622, but is instead connected to a near switching node 628. The near switching node 628 is between a capacitive/resistive voltage divider wherein one capacitor/resistor pair 630, 631 are connected in parallel between the near switching node 628 and the switching node 622 and wherein the second capacitor/resistor pair 632, 633 are connected in parallel between the near switching node 628 and the source of the switching transistor 621 (or to ground without a connection to the source of the switching transistor 621 as shown as a dotted line in FIG. 6). In embodiments, the impedance of capacitor 630 is larger than the impedance of capacitor 632. Furthermore, the impedance ratio of capacitor 630 to capacitor 632 will be substantially the same as the resistance ratio of resistor 631 to resistor 633. The wave forms of this exemplary critical conduction resonant transition boost LED driver 602 are similar to those shown in FIGS. 3A, 3B and 3C in that when the switching transistor 621 is turned off and the current through the switching inductor 620 degrades to zero, then the near switching node capacitors 630 and 632 discharge either through the inductor 620 or via the resistor 634 until the near switching node voltage goes to zero during the time period between $T_4$ and $T_5$ of FIG. 3C. When the near switching node 628 voltage goes to zero (or near ground potential) it is sensed by the zero transition sensing circuit of the LED control circuit 606 which results in the output of the switching signal 636 being provided to turn on the switching transistor 621 to start the next switching cycle. The output voltage 650 is provided at about 120 milliamps at about 300 volts so that it can drive about 70 or more light emitting diodes that are connected in series 652. Embodiments may be configured to provide a regulated output voltage 650 ranging from about 20 to about 500 volts DC. A current limiting resistor 654 is provided along with an output voltage smoothing capacitor 656. In some embodiments, the dimming transistor 658, which may be a MOSFET device, is oscillated on and off using the output DIM 660, which is a signal created in the LED driver control circuit 606 by an LED dimmer oscillation circuit that uses a dimmer signal DIM SIG 608 to set its output oscillation frequency. The DIM 660 is provided to oscillate or turn on and off the dimming transistor 658 at a frequency between about 20 and 20,000 Hz. It should be noted that because the output capacitors 656 can be small in value, due to the high switching frequencies afforded by the present invention, this dimming frequency does not cause the output smoothing capacitors 656 to exhibit a piezoelectric acoustic noise, or in any case such an effect is substantially decreased or minimized. As such, teachings of the present invention can be used to provide an exemplary boost LED driver that uses critical conduction moments and resonant transition boost in accordance with the exemplary teachings of the invention, which operates at a switching frequency of between 100 kHz and 2 MHz without the adverse power loss, switching loss, piezoelectric audio effects, at a lower manufacturing cost due to smaller component size, than prior hard switched boost regulator circuits.

In other embodiments, a dimming signal, such as DIM SIG 608, is provided to the LED control circuit 606 and buffered prior to being provided to the gate of the dimming transistor 658.

The current through the source of the dimming transistor 658 is monitored by a LED current feedback circuit 662, which senses a voltage 664 induced by the current through resistor 666. The current feedback circuit 662 provides an error signal 670 to the control circuit 607 based on, for example, a comparison of a signal 664 with a voltage reference. The gate driver logic circuit 508 of the control circuit may turn off or adjust the duty cycle of the switching signal 636 in response to the error signal 670.

In additional embodiments, a BJT transistor may be used as the switching transistor of exemplary boost regulators.

It will be appreciated by those skilled in the art having the benefit of this disclosure that this critical conduction resonant transition boost power circuit provides a lower loss, more efficient, higher operating frequency boost regulator circuit adapted to have smaller physical size capacitor and inductive components than prior art devices. Exemplary boost regulator circuits are adapted to switch during the critical conduction period of the boost regulator circuit thereby substantially eliminating the $CV^2$ power losses associated with prior art boost regulator circuits. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A boost regulator circuit comprising:
an inductor having a first inductor connection to a voltage input and a second inductor connection to a switching node;
a switching transistor having a drain (collector) connected to the switching node, a source (emitter) electrically connected to ground directly or through a sense resistor, and a gate (base);
a diode having an anode connected to the switching node and a cathode connected to an output node;
a plurality of light emitting diodes electrically connected in series to the output node;
a dimming transistor electrically connected between ground and at least one of the plurality of light emitting diodes;
a capacitor/resistor voltage divider connected between the switching node and ground, the capacitor/resistor voltage divider including a first capacitor/resistor pair and a second capacitor/resistor pair, the first capacitor/resistor pair connected in parallel between the switching node and a near switching node and the second capacitor/resistor pair connected in parallel between the near switching node and the source (emitter) of the switching transistor; and
a light emitting diode control circuit, the light emitting diode control circuit including a control circuit having a first input directly connected to the near switching node and a switching signal output connected to the gate (base), the control circuit configured to provide a switching signal, at the switching signal output, to the gate (base) when a near switching node potential at the near switching node is at least substantially near a ground potential and a current through the inductor is at least substantially near zero to cause the switching transistor to transition from an off state to an on state, the light emitting diode control circuit electrically connected to the dimming transistor and configured to cause the dimming transistor to oscillate between an on state and an off state to control a current through the plurality of light emitting diodes, the light emitting diode control circuit controlled by a backlight control system.

2. The boost regulator circuit as recited in claim 1, wherein the control circuit comprises a zero transition sense circuit connected to the near switching node, the zero transition sense circuit configured to determine when the near switching node potential at the near switching node is at least substantially near the ground potential; a gate driver logic circuit connected to the zero transition sense circuitry and connected to the gate (base) by way of the switching signal output, wherein the zero transition sense circuit is configured to provide a zero voltage signal to the gate driver logic circuit when the zero transition sense circuit determines that the near switching node potential is at least substantially near a ground potential, the zero voltage signal representing that the near switching node potential is at least substantially near the ground potential and the gate driver logic is configured to provide the switching signal to the gate (base) in response thereto.

3. The boost regulator circuit as recited in claim 2, wherein the control circuit further comprises a current sense input connected to the source (emitter), the current sense input connected to a current sense circuit, the current sense circuit configured to determine whether a current sense voltage at the current sense input is within a predetermined limit, the current sense input representing the current flow through the switching transistor, wherein the current sense circuit is configured to cause the gate driver logic circuit to cause the switching transistor to transition from the on state to the off state when the current sense voltage is greater than the predetermined limit.

4. The boost regulator circuit as recited in claim 2, wherein the control circuit further comprises a voltage reference circuit connected to the gate driver logic circuit, the voltage reference circuit configured to receive a voltage signal indicative of an output voltage at the output node and to provide a feedback voltage signal based upon the voltage signal to the gate driver logic circuit, wherein the gate driver logic circuit is configured to adjust a duty cycle of the switching signal to maintain the output voltage within a predetermined voltage range.

5. The boost regulator circuit as recited in claim 4, wherein the voltage reference circuit is configured to compare the voltage signal indicative of the output voltage to a reference voltage to generate the feedback voltage signal, the feedback voltage signal representing a difference between the voltage signal indicative of the output voltage and the reference voltage.

6. The boost regulator circuit as recited in claim 1, configured to provide an output voltage of about 20 volts to about 500 volts DC.

7. The boost regulator as recited in claim 1, wherein the control circuit is further configured to provide a switching signal to the gate when the control circuit senses that the near switching node is substantially near the ground potential and that a current through the inductor is substantially near zero.

8. The boost regulator as recited in claim 1, wherein the control circuit is further configured to provide a switching signal when the inductor is in a period of critical conduction, wherein the period of circuit conduction represents the moment when a current through the inductor is at least substantially zero.

9. The boost regulator as recited in claim 1, wherein a current in the inductor may flow in a direction toward the voltage input during a period of critical conduction.

10. A boost regulator circuit comprising:
a control circuit, the control circuit comprising: a gate driver logic circuit configured to provide a switching signal to a gate (base) of a switching transistor, the switching signal configured to cause the switching transistor to transition between an on state and an off state;
a minimum voltage sense circuit directly connected to a switching node, comprising a comparison circuit, configured to sense that a switching node voltage of the switching node is approaching a minimum voltage, the minimum voltage sense circuit further configured to provide an approaching-minimum signal to the gate driver logic circuit when the switching node voltage is approaching the minimum voltage and when a current through an inductor connected to the switching node is at least approximately zero, wherein the gate driver logic is configured to provide the switching signal in response to receiving the approaching-minimum signal from a near switching node to cause the switching transistor to transition from the off state to the on state;
a capacitor/resistor voltage divider connected between the switching node and ground, the capacitor/resistor voltage divider including a first capacitor/resistor pair and a second capacitor/resistor pair, the first capacitor/resistor pair connected in parallel between the switching node and the near switching node and the second capacitor/resistor pair connected in parallel between the near switching node and a source (emitter) of the switching transistor; and
a plurality of light emitting diodes electrically connected in series to the switching transistor and to the inductor, the plurality of light emitting diodes configured to provide illumination within a backlighting environment, the plurality of light emitting diodes controlled by a backlight control system.

11. The boost regulator circuit as recited in claim 10, wherein the control circuit further comprises: a feedback connection; a voltage comparison circuit connected to the feedback connection, the voltage comparison circuit being configured to compare a feedback voltage with a voltage reference and to provide a signal that is used by the control logic circuit to adjust a duty cycle of the switching signal.

12. The boost regulator circuit as recited in claim 10, wherein the control circuit further comprises a dimmer circuit configured to output a dim signal, having a dim frequency, to a dimming transistor's gate (base), the dim frequency being controlled by a dimmer signal received by the control circuit.

13. The boost regulator circuit as recited in claim 12, further comprising a current feedback circuit configured to connect to the dimming transistor's source (emitter), the current feedback circuit configured to provide an error signal to the gate driver logic circuit.

14. The boost regulator circuit as recited in claim 10, further comprising: an inductor electrically connected to a voltage input connection on a first side and to the switching node on a second side; the switching transistor having a drain (collector) connected to the switching node, a gate (base) connected to an output of the gate driver logic circuit, and the source (emitter) electrically connected to ground.

15. A boost regulator circuit comprising:
an inductor having a first inductor connection to a voltage input and a second inductor connection to a switching node;
a switching transistor having a drain, a source, and a drain, the drain connected to the switching node;
a capacitor/resistor voltage divider connected between the switching node and ground, the capacitor/resistor voltage divider including a first capacitor/resistor pair and a second capacitor/resistor pair, the first capacitor/resistor pair connected in parallel between the switching node and a near switching node and the second capacitor/resistor pair connected in parallel between the near switching node and the source of the switching transistor;
a diode having an anode connected to the switching node and a cathode connected to an output node;
a plurality of light emitting diodes electrically connected in series to the output node;
a dimming transistor electrically connected between ground and at least one of the plurality of light emitting diodes; and
a light emitting diode control circuit, the light emitting diode control circuit including a control circuit having a first input directly connected to the near switching node and a switching signal output connected to the gate, the control circuit comprising:
a zero transition sense circuit connected to the first input, the zero transition sense circuit configured to determine when a near switching node potential at the near switching node is at least substantially at zero volts; and
a gate driver logic circuit connected to the zero transition sense circuitry and connected to the gate,
wherein the zero transition sense circuit is configured to provide a zero voltage signal to the gate driver logic circuit when the switching node potential is at least substantially near zero volts and a current through the inductor is at least approximately near zero amperes, the gate driver logic configured to provide the switching signal to the gate in response to receiving the zero voltage signal,
wherein the light emitting diode control circuit is electrically connected to the dimming transistor and configured to cause the dimming transistor to oscillate between an on state and an off state to control a current through the plurality of light emitting diodes, the light emitting diode control circuit controlled by a backlight control system.

16. The boost regulator circuit as recited in claim 15, the control circuit further comprising a current sense input connected to the source, the current sense input connected to a current sense circuit, the current sense circuit configured to determine whether a current sense voltage at the current sense input is within a predetermined limit, the current sense input representing the current flow through the switching transistor, wherein the current sense circuit is configured to cause the gate driver logic circuit to cause the switching transistor to transition from the on state to the off state when the current sense voltage is greater than the predetermined limit.

17. The boost regulator circuit as recited in claim 16, the control circuit further comprising a voltage reference circuit connected to the gate driver logic circuit, the voltage reference circuit configured to receive a voltage signal indicative of an output voltage at the output node and to provide a feedback voltage signal based upon the voltage signal to the gate driver logic circuit, wherein the gate driver logic circuit is configured to adjust a duty cycle of the switching signal to maintain the output voltage within a predetermined voltage range.

18. The boost regulator as recited in claim 17, wherein the voltage reference circuit is configured to compare the voltage signal indicative of the output voltage to a reference voltage to generate the feedback voltage signal, the feedback voltage signal representing a difference between the voltage signal indicative of the output voltage and the reference voltage.

19. The boost regulator as recited in claim 15, wherein the gate control circuitry is configured to provide a switching signal when the inductor is in a period of critical conduction, wherein the period of circuit conduction represents the moment when a current through the inductor is at least substantially zero.

* * * * *